Aug. 5, 1958            A. F. PITYO            2,846,561
METHOD OF AND APPARATUS FOR FORMING U-SHAPED MEMBERS
AND WELDING THE SAME TO METALLIC PARTS
Filed Feb. 1, 1957            6 Sheets-Sheet 5

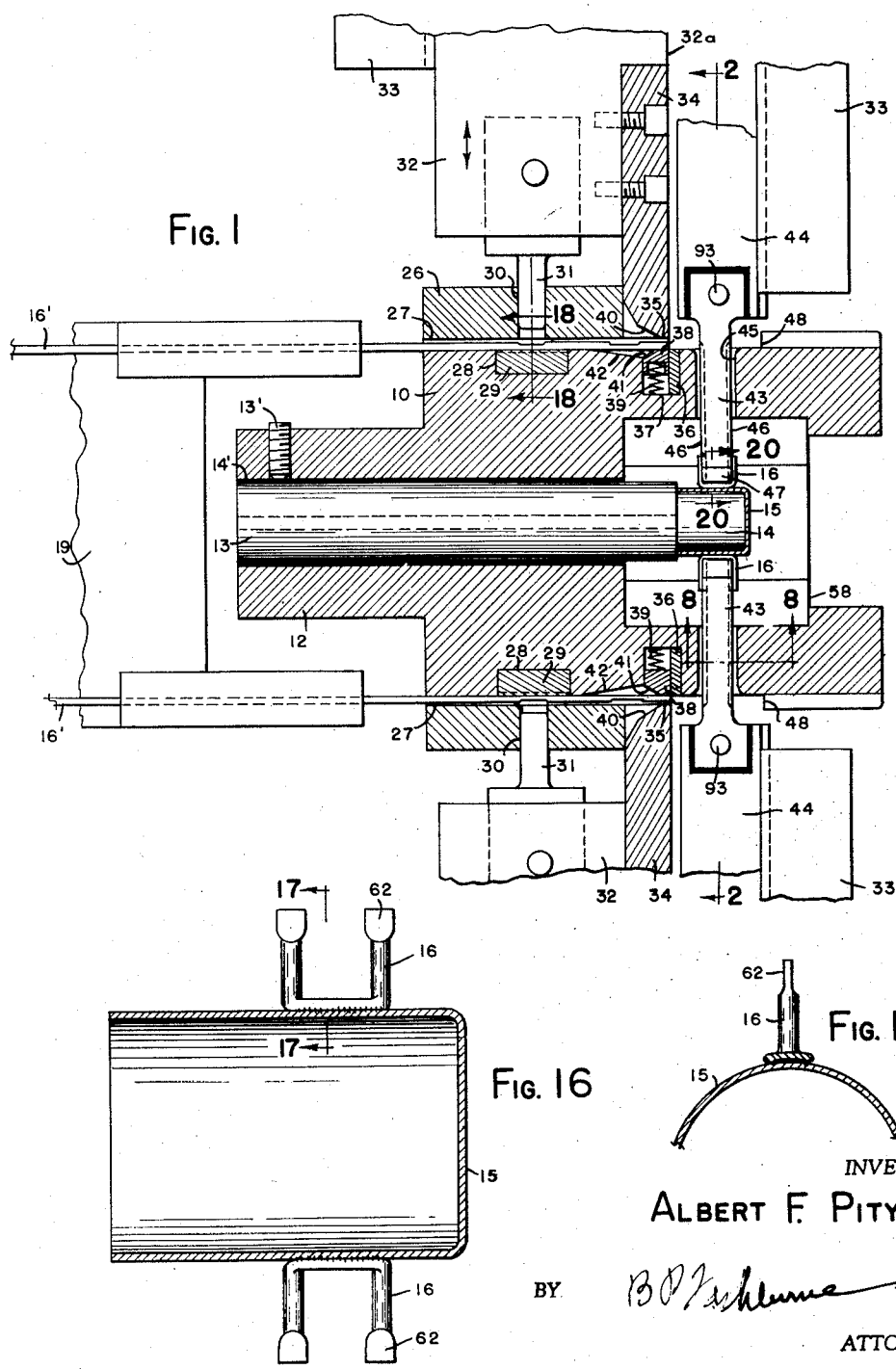
Aug. 5, 1958     A. F. PITYO     2,846,561
METHOD OF AND APPARATUS FOR FORMING U-SHAPED MEMBERS AND WELDING THE SAME TO METALLIC PARTS
Filed Feb. 1, 1957     6 Sheets-Sheet 1
INVENTOR
ALBERT F. PITYO
BY
ATTORNEY Aug. 5, 1958 A. F. PITYO 2,846,561
METHOD OF AND APPARATUS FOR FORMING U-SHAPED MEMBERS
AND WELDING THE SAME TO METALLIC PARTS
Filed Feb. 1, 1957 6 Sheets-Sheet 2
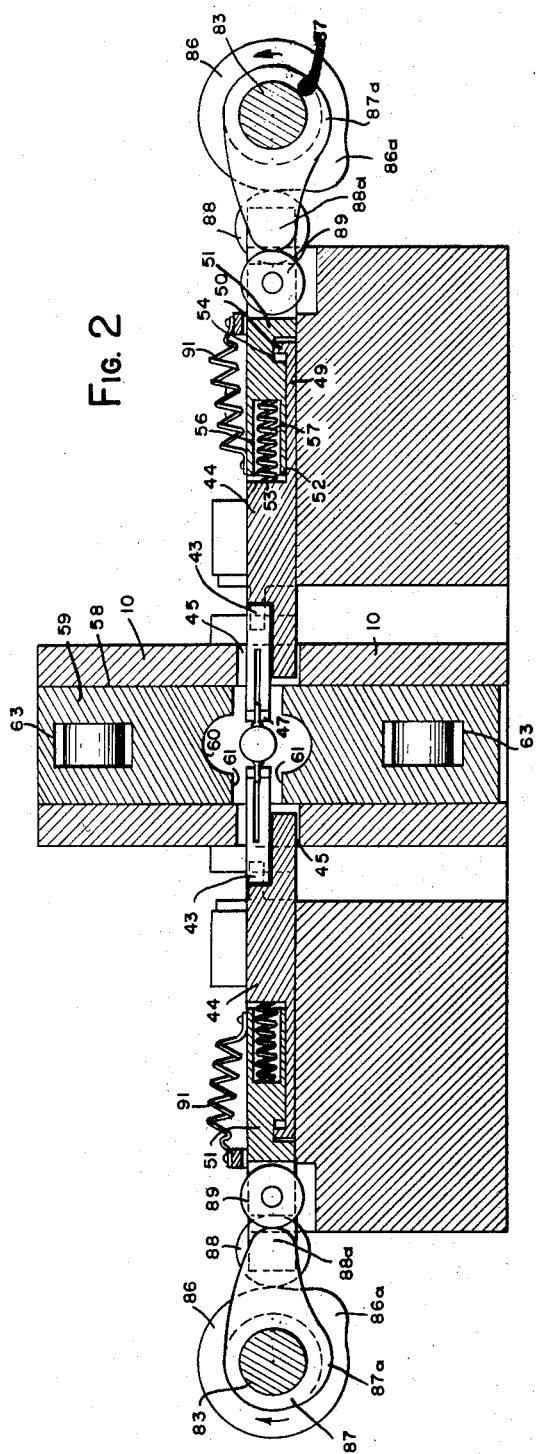
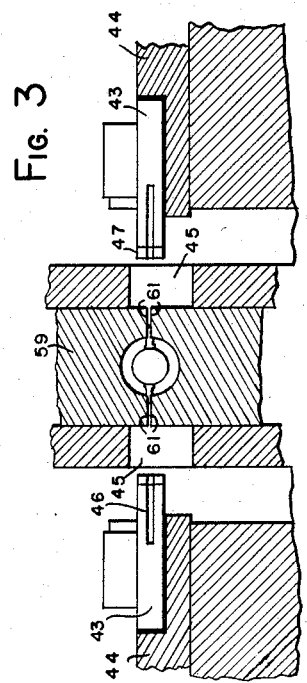
INVENTOR
ALBERT F. PITYO
BY
ATTORNEY

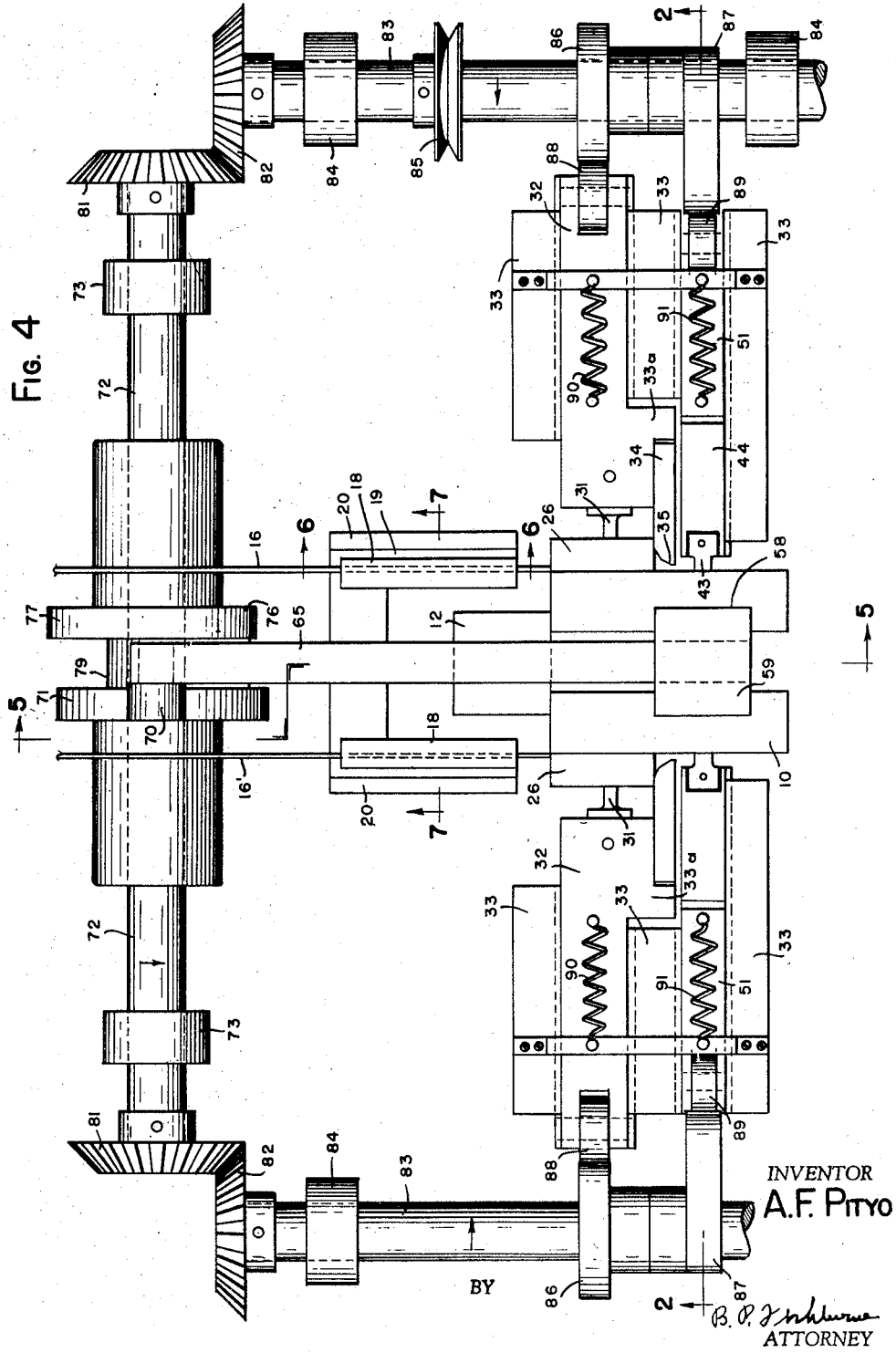

INVENTOR
ALBERT F. PITYO

BY

ATTORNEY

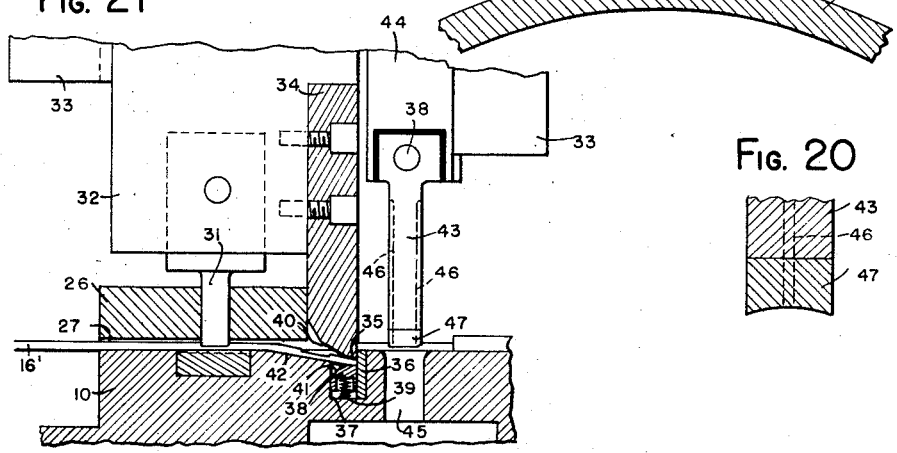

United States Patent Office 2,846,561
Patented Aug. 5, 1958

2,846,561

METHOD OF AND APPARATUS FOR FORMING U-SHAPED MEMBERS AND WELDING THE SAME TO METALLIC PARTS

Albert F. Pityo, Cedar Grove, N. J.

Application February 1, 1957, Serial No. 637,819

18 Claims. (Cl. 219—79)

My invention relates to a method of and apparatus for forming generally U-shaped elements and welding the same to metal parts.

An important object of the invention is to provide a method of the above-mentioned character which will feed or index the wire longitudinally and perform the various steps of the method in proper sequence.

A further object of the invention is to provide a method for forming a flattened portion in the wire and then bending the wire into the generally U-shaped element upon points adjacent to the ends of the flattend portion.

A further object of the invention is to positively force the wire through a tubular die to form the same into the desired shape and then apply the formed element to a metal part and yieldingly press such element to the metal part during the welding period.

A further object of the invention is to provide apparatus which may be employed in carrying out the method, in whole or in part.

Other objects and advantages of the invention will be apparent during the course of the following description.

Figure 5:
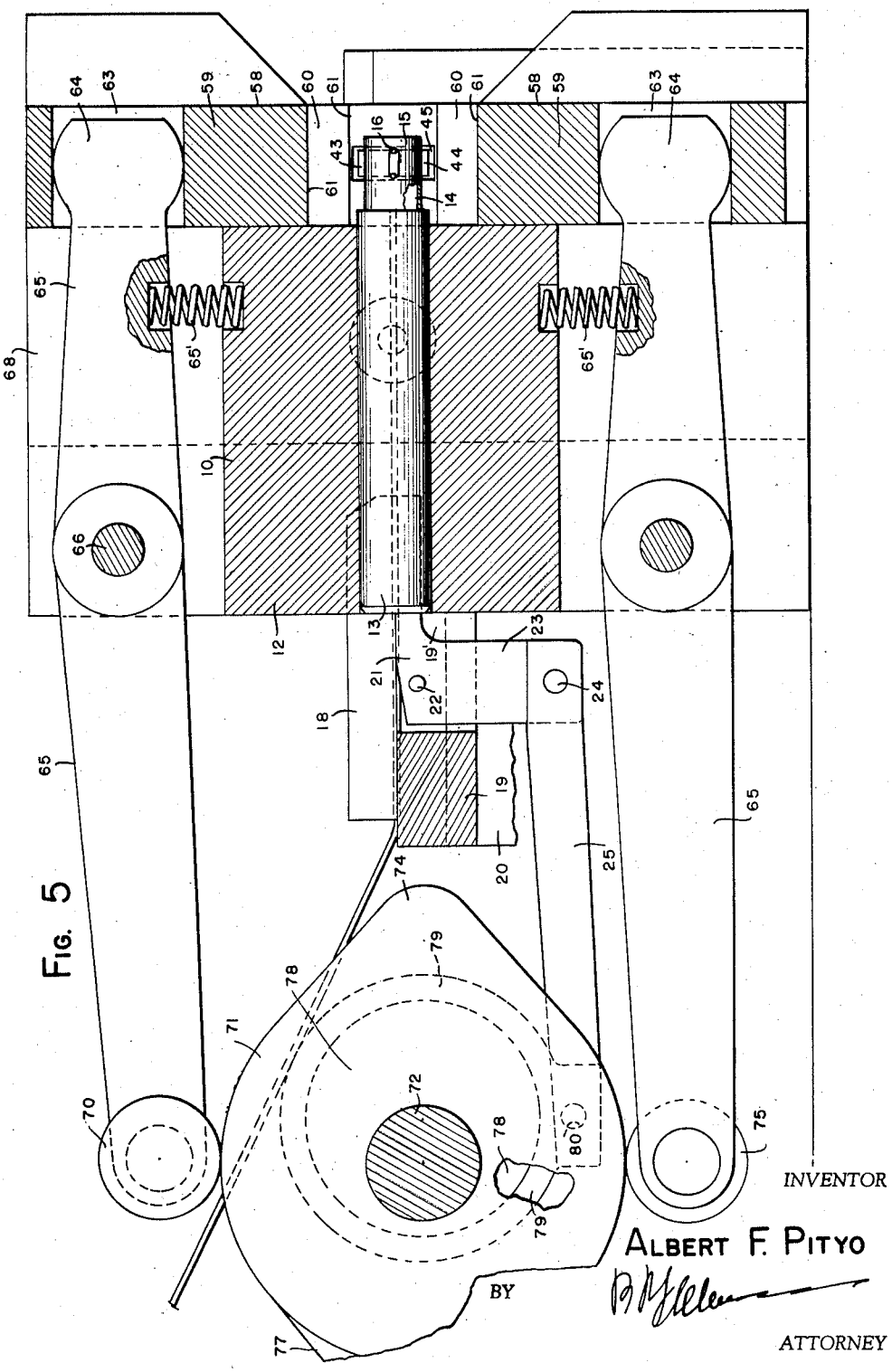
Figure 10:
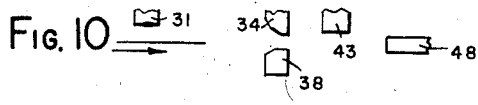
Figure 6:
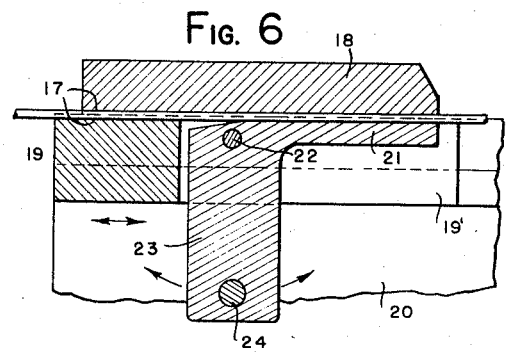
Figure 11:
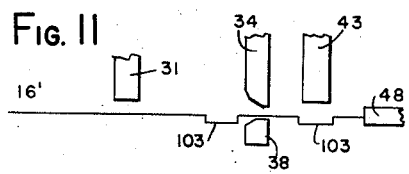
Figure 12:
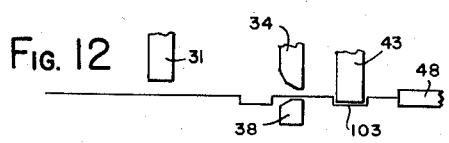
Figure 7:
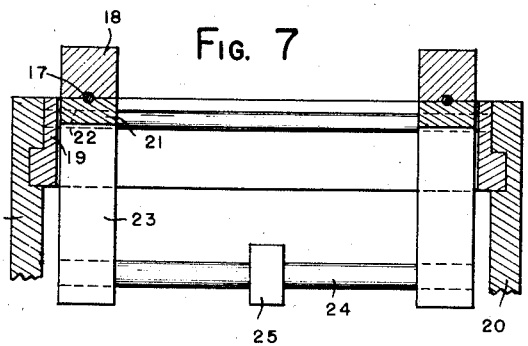
Figure 8:
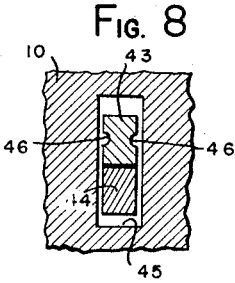
Figure 9:
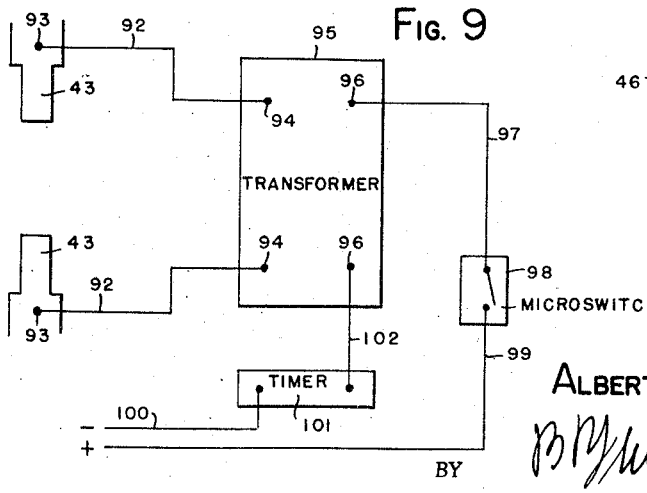

In the accompanying drawings forming a part of this application and in which like numerals are employed to designate like parts throughout the same, Figure 1 is a horizontal section through apparatus embodying my invention, parts in elevation, and parts broken away, taken on line 1—1 of Figure 2, Figure 2 is a vertical section taken on line 2—2 of Figure 1, Figure 3 is a view similar to Figure 2, parts broken away, showing the end flattening punches in the inner position, Figure 4 is a plan view of the apparatus, Figure 5 is a vertical section taken on line 5—5 of Figure 4, Figure 6 is a vertical section taken on line 6—6 of Figure 4, Figure 7 is a vertical section taken on line 7—7 of Figure 4, Figure 8 is a vertical section taken on line 8—8 of Figure 1, Figure 9 is a diagrammatic view of a welding circuit, Figures 10 to 15 inclusive are diagrammatic views showing steps of the method, Figure 16 is a central vertical longitudinal section through the sleeve, showing the U-shaped elements welded thereto, Figure 17 is a transverse section taken on line 17—17 of Figure 16, Figure 18 is an enlarged transverse section, parts broken away, through the flattening punch and coacting insert, taken on line 18—18 of Figure 1, the flattening punch being in the partly raised position, Figure 19 is a transverse section through the U-shaped member, after its base has been flattened, and the sleeve, parts broken away, showing the elements in position prior to welding, Figure 20 is a vertical section through the forming and welding punch, taken on line 20—20 of Figure 1, Figure 21 is a plan view of the punches and blade, parts in horizontal section, the forming flattening punch being in the innermost position, the blade in the innermost severing position and the forming and welding punch in the holding position, Figure 22 is a side elevation of the forming and welding cam, and the forming flattening cam arranged behind it, Figure 23 is a side elevation of the forming flattening cam, Figure 24 is a side elevation of the cams for operating the levers.

Figure 25 is a side elevation of the eccentric for feeding the wire, and associated elements.

The apparatus comprises a horizontal block 10, preferably formed of metal. This block is mounted upon a suitable stationary base. The block has a tubular extension 12, preferably formed integral therewith, to receive a tubular mandrel 13, clamped in place by a set screw 13' or the like. The mandrel 13 is rigidly mounted within the block 10 and tubular extension 12, and may be removed therefrom, and this mandrel is preferably insulated from these parts. The set screw 13' serves to clamp a portion of the insulation 14' against the mandrel. The mandrel 13 is provided at its forward end with a reduced extension 14, to receive thereon a metallic sleeve 15, upon which the U-shaped members 16 are to be welded. The mandrel 13 and extension 14 are formed of metal and are preferably cylindrical. The sleeve 15 is cylindrical and has an outer closed end, since the sleeve is cup-shaped. The sleeve may be removed from the extension 14 by hand or it may be removed by air pressure which is blown through the tubular mandrel 13. If desired, the sleeve 15 may have both ends open, in which event it would be manually removed from the mandrel or by means other than air pressure blown through the tubular mandrel.

It might be stated at this point that the mandrel 13 is stationary and is not indexed, and the U-shaped members 16 are applied to the opposite side portions of the sleeve 15, preferably at substantially diametrically opposite points. The U-shaped members 16 may be arranged radially of the sleeve 15 or inclined with respect to the radius. The invention is not restricted to arranging the U-shaped members diametrically opposite to each other, as the arrangement may be varied. The U-shaped members 16 may be simultaneously pressed against the sleeve and simultaneously welded to the sleeve, or they may be secured thereto in succession. I also contemplate indexing the mandrel by turning it upon its longitudinal axis, so that the U-shaped members 16 may be attached to the sleeve in succession, in varying numbers, if desired. I contemplate attaching a single U-shaped member to the sleeve.

In Figures 1 and 4, I have shown two strands of metal wire 16', for producing the U-shaped members 16 which may be simultaneously attached to the sleeve 15. These wires 16', Figure 6, are threaded through grooves 17, formed in upper relatively stationary jaws 18, and a stationary slide 19, upon which the jaws 18 are rigidly mounted. The slide 19 reciprocates and is mounted upon stationary supports 20. Arranged beneath the stationary jaws 18 are vertically swinging horizontal jaws 21, pivoted to the slide 19 at 22. These pivoted jaws carry depending cranks 23, connected by a rod 24, pivotally connected with a pitman 25, Figure 5, and this pitman is reciprocated by a cam device. The slide 19, Figure 5, has slots 19' to receive the jaws 21 and cranks 23. It is thus seen that when the pitman 25 moves forwardly, it will swing the cranks 23 forwardly and the jaws 21 will clamp the wires 16' to the stationary jaws 18, and the jaws and slide 19 are then shifted forwardly to feed or index the wire to the next position.

Rigidly secured to the opposite sides of the block 10 are blocks 26, Figures 1, 4 and 4a, having grooves 27 formed therein to receive and guide the wires 16'. The blocks 10 are provided with recesses 28, to receive hard steel blocks or inserts 29. The steel blocks are shown as provided with curved faces 29a, corresponding to the curvature of the sleeve 15, and the curved faces have grooves 30a, V-shaped in cross section. The curved face 29a is adapted for coaction with a curved face 31a of an element 47, to be described.

The blocks 26 have horizontal openings 30 for receiving horizontal punches 31. The punches 31 and openings 30 are preferably square in cross section. The punches 31 are rigidly secured to slides 32, having inclined edges slidably engaging within stationary guides 33, to reciprocate therein. Each slide 32 has a lateral extension 33a. A horizontal reciprocatory blade 34 is rigidly secured to each lateral extension 33a, by screws 34' or the like. There are two blades 34, upon opposite sides of the block 10, corresponding to the arrangement of the slides or carriages 32, and these blades have cutting edges 35, vertically arranged to coact with the cutting edges of stationary blades 36. Each blade 36 is mounted in a recess 37. Mounted within each recess 37 is a horizontal reciprocatory plunger 38, urged outwardly by a spring 39. Each blade 34 may have an inclined face 40 and the plunger 38 has an inclined face 41, and the vertical face of the block 10 has a recess 42 formed therein. Each plunger 38 moves outwardly after the cutting operation of the wire, to return the cut end of the wire to the normal straight position so that it will clear the stationary blade 36, when the wire is again indexed. The slides 32 are operated by cam means, to be described, but could be manually operated. As more clearly shown in Figures 1 and 21, the forward cutting edge of the blade 34 projects forwardly beyond the punch 31, for a considerable distance. This is an important feature of the invention, since the blade 34 completely severs the wire before or at about the time that the punch 31 has moved inwardly sufficiently to form the recess in the wire, Figure 21.

The numeral 43 designates opposed horizontal wire forming punches, which are rigidly mounted upon slides or bars 44, and insulated therefrom, Figure 2. The slides or bars 44 have recesses which receive the forming punches 43. The bars 44 have inclined edges which engage the guides 33, so that the bars are guided in their reciprocatory movement. The wire forming punches 43 are adapted to be moved into and out of the openings 45, Figures 1, 3 and 8, formed in the block 10. The punches 43 and the openings 45 are rectangular in cross section, Figure 8. The openings 45 are larger than the punches 43 and the punches do not contact with the walls of the openings 45 and hence the punches are electrically insulated from the block 10. The punches 43 are provided upon their opposite vertical edges with longitudinal grooves 46, oppositely arranged, as shown. Each punch 43 carries the contact block 47 rigidly mounted thereon and formed of metal. This block is of course electrically connected with the metal punch 43 and the block is formed of a metal which will not readily oxidize during the welding operation. The grooves 46 extend through the sides of the block 47 and are continuous to the inner end of this block. The block 47 is of the same shape and size as the punch 43. The block 10 is provided near the openings 45 with stop shoulders 48 arranged in the path of travel of the wires 16'. The punch 43 must move inwardly beyond the inner end of the opening 45 of the tubular die and outwardly beyond the outer end of the opening 45, so that the wire 16' can be indexed across the outer end of the opening 45.

As more clearly shown in Figure 2, each slide 44 is provided with a reduced portion 49, having an upstanding finger 50. A coacting slide 51 is mounted upon the reduced portion 49 and has a forward end 52 to engage and disengage a shoulder 53 of the slide 44, Figure 2. The slide 51 has a recess 54 formed therein, to receive the finger 50, and the recess 54 is longer than the width of the finger. The slide 51 has a recess 56 formed therein, to receive a compressible coil spring 57, one end of which bears against the shoulder 53. It is thus seen that when the slide 51 is moved inwardly to form the U-shaped member 16, considerable pressure is needed, and the action of the spring 57 is overcome and the end 52 will directly contact with the shoulder 53, and the slides 44 and 51 are, in effect, rigidly connected, so that sufficient pressure can be applied to the slide 44. When this pressure is relieved from the punch 43, the spring 57 will separate slides 44 and 51, and the spring 57 will yieldingly advance the slide 44 and punch 43, as will be more fully explained. The outer slides 51 are reciprocated by cam means, as will be described, or they may be manually operated.

The block 10, Figures 1, 2, 3, 4 and 5, has a vertical opening 58, which is in effect continuous. This opening receives vertically reciprocatory punches 59, having recesses 60 and flat jaws 61. The punches 59 are disposed above and below the mandrel 13 and the U-shaped members 16. When the punches 59 move inwardly, at the proper time, their faces 61 contact with the outer ends of the U-shaped members and spread and flatten the same, providing thin portions 62, Figure 16.

The punches 59, Figure 5, have openings 63 formed therein to receive cylindrically curved heads 64 carried by levers 65. These levers are pivotally mounted upon pins 66, secured to the block 10. The levers operate within recesses 68 and have springs 65' to move them in one direction. The levers 65 are operated by cam means to be described, or the punches 59 might be manually operated.

Each wire 16' is fed into or through the groove 17 in the stationary jaw 18 and slide 19, Figure 6, so that the wire 16' projects forwardly beyond the jaw 18 for the proper distance, Figures 1 and 6. The link 25 is now moved forwardly, which causes the pivoted jaw 21 to clamp the wire 16' against the stationary jaw 18 and the carriage 19 and jaws 18 and 21 are advanced to the forward position, and the wire 16' is indexed or moved forwardly a step and is then brought to rest. When the carriage 19 moves rearwardly, the pivoted jaw 21 releases the wire 16', and the pivoted jaw slides over the same, when the carriage is moved rearwardly. It is thus seen that the wire is fed or indexed a step for each complete cycle of operation of the carriage. The carriage 19 moves rearwardly when the punch 31 engages the wire.

As more clearly shown in Figures 4 and 5, the upper lever 65 has a roller 70 rotatably mounted upon its outer end and arranged to engage a cam 71 rigidly mounted upon a horizontal rotatable shaft 72, journaled in stationary bearings 73. This cam has a high part 74. The lower lever 65 has a roller 75 rotatably mounted thereon to engage a cam 76, rigidly mounted upon the shaft 72 and having a high part 77. The shaft 72 is provided between the cams 71 and 76 with a cam or eccentric 78, Figures 4 and 5, and the cam 78 carries a cam strap 79, pivoted at 80 with the link 25, Figure 5.

The shaft 72 has bevel-gears 81 rigidly secured thereto, engaging bevel-gears 82, rigidly mounted upon horizontal shafts 83 journaled in suitable bearings 84. One shaft 83 may be equipped with a pulley 85 or like means whereby the shaft may be driven. Each shaft 83 is provided with cams 86 and 87 which are identical and which are rigidly mounted upon the shaft 83. The cam 86 engages a roller 88 rotatably mounted upon the outer end of the slide 32. The cam 87 engages a roller 89 which is rotatably mounted upon the slide 51, Figures 2 and 4. The cam 87 may be arranged slightly in advance of the cam 86 so that the forming punch will engage with the wire before the wire is severed.

In view of the foregoing description, it is obvious that means are provided to operate the parts in proper timed order. The slide 32 is moved outwardly by a retractile coil spring 90 attached thereto at one end and at its opposite end to a fixed support, to cause the roller 88 to follow the cam 86. The slide 51 is moved outwardly by a retractile coil spring 91 attached at one end to the slide and to a fixed support at the other end, to cause the roller 89 to follow the cam 87.

I have shown a welding circuit, Figure 9, wherein wires 92 are electrically connected with the punches 43 by binding posts 93. The opposite ends of these wires are connected with binding posts 94, conected with a secondary winding of a transformer 95, having binding posts 96 connected with the primary winding of the transformer. A wire 97 is connected with one binding post 96 and is connected with one terminal of a microswitch 98, the opposite terminal of which is connected with a wire 99 leading to one side of a source of current. A wire 100 leads to the opposite side of the source of current and is connected with one terminal of a timer 101, the other terminal of which is connected with a wire 102 connected with the other binding post 96. The circuit is substantially the same as shown in Figure 9 of Patent 2,578,835 and the operation is the same.

Figure 13:
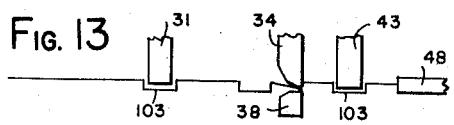
Figure 14:
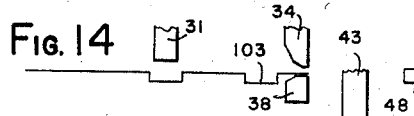

As shown in Figures 10 to 15 inclusive, the indexing of the wire is presented. Starting from the position of Figure 10, the wire is indexed for three steps so that its leading end engages the stop 48. Two flattened portions have been formed in the wire. The leading flattened portion is in alignment with the punch 43, Figure 11. The punch 31 and the blade 34 are in the outer position and the punch 43 is in the outer position, Figure 11. The punch 43 now moves inwardly for a part of its stroke and engages the flattened portion 103, and holds the wire 16' against movement, while punch 31 and blade 34 remain in the outer position, Figure 12. The punch 43 dwells in the holding position, Figures 12 and 13, and the punch 31 and the blade 34 now move inwardly. The cutting edge 35 of the blade 34 is in advance of the punch 31, and elements 31 and 34 move inwardly simultaneously, but the blade 34 severs the wire before the punch 31 has reached the end of its inward movement to form the third flattened portion 103, Figure 13. The dwell of the punch 43, Figures 12 and 13, may be caused by the space between the end 42 and the shoulder 43 and the spring 57, Figure 2. The dwell may be effected by other means which may include the proper shaping of the cam 87. When the blade 34 moves inwardly, the plunger 38 is moved inwardly. When the blade again moves outwardly, the plunger 38 will move outwardly and move the free end of the wire to the outer position so that the free end portion of the wire is straightened and the free end of the wire can clear the blade 36, Figure 1, upon the next longitudinal step or index of the wire. In Figure 13, the punch 31 and the blade 34 are in the inner position and the punch 43 in the intermediate holding position. In Figure 14, the punch 43 has moved further inwardly and has reached its innermost position. The punch 43 first carries the severed wire section 17' through the opening 45 of the tubular die, which forms the wire section into the U-shaped member 16. The sides of the U-shaped member 16 are held within the grooves 46 of the punch 43. When the punch 43 moves further inwardly, Figure 1, the U-shaped member 16 is moved out of the opening 45 of the tubular die and moved inwardly beyond this opening so that its flattened portion 103 is brought into contact with the side of the sleeve 15, Figure 1, and the punch 43 yieldingly presses the U-shaped member against the sleeve 15 by virtue of the action of the spring 57, Figure 2. By the time the punch 43 reaches this innermost position, punch 31 and blade 34 have been moved to the outer position, Figure 14. The welding circuit is now closed while the U-shaped member 16 is yieldingly pressed against the sleeve 15, and the welding of the member 16 to the sleeve is effected, the pressure following through during the welding time, by virtue of the spring 57. The welding circuit is opened by the timer 101. During the welding time or while the punch is in the innermost position, the punch 31 and blade 34 are moved to the outer position and the plunger 38 shifts the leading end of the wire 16' outwardly so that the end portion of the wire is straightened, Figure 14. After the welding has been completed, the punch 43 moves to the outer position, outwardly of the path of travel of the wire, and elements 31 and 34 are also in the outer position, Figure 15. The wire is next indexed to bring the free end of the wire in contact with the shoulder 48, Figure 11. The cycle of steps of the method are now repeated.

Figure 15:
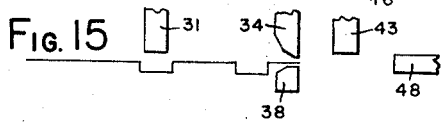

When the various elements are in the position shown in Figure 15, the punches 59 move inwardly and the jaws 61 form the thin flattened ends 62, Figure 16, and the punches 59 again move to the outer positions, to be out of the way so that the punches 41 and 43 may move inwardly.

In Figure 21, the cam 87, Figures 4, 22 and 23, has shifted the slide 44 inwardly, so that the inner end of the punch 43 is pressing against the wire 16', to hold it against movement. This is effected by the high part 87a of the cam 87 engaging the roller 89 and moving it inwardly. The cam 87 is turning in the direction of the arrow and there is a dwell of the slide 44 while the roller 89 continues to engage the high part 87a. The high part 87a is arranged somewhat in advance of the high part 86a of the cam 86, Figures 22 and 23, and the high part 87a will cause punch 43 to engage the wire before the high part 86a moves the punch 31 and blade 34 in engagement with the wire and the punch 43 continues to engage the wire after punch 31 and blade 34 engage the wire. The high part 86a engages the roller 88, shifting the slide 32 inwardly. The continued turning movement of the shaft 83 causes the high part 88a to engage the roller 89 while the high part 86a of cam 86 moves out of engagement with or in a direction from roller 88. Slide 32 is thus moved outwardly by the spring 90, while the high part 88a shifts the slide 32 and punch 43 to the innermost position, Figure 1, so that the U-shaped member is pressed against the sleeve 15, and the welding occurs while the roller 89 travels over the end of the high part 88a. The shaft 83 continues to turn the cam 87 in the direction of the arrow, and the high part 88a moves outwardly and the roller 89 follows the cam and the slide 44 moves outwardly and punch 43 moves outwardly so that the end of the wire can pass between the end of the punch and the tubular die and engage the block 48. The punch 31, blade 34 and punch 43 are now in the outer position until the cams 87 and 86 return them to the position shown in Figure 21.

The various steps of the method may be performed manually as well as by the use of the apparatus herewith shown and described.

It is to be understood that the form of my invention herewith shown and described as embodied in the apparatus, is to be taken as a preferred example of the same and that various changes in the shape, size and arrangement of parts may be made, and that changes may also be made in the order of the steps of the method, without departing from the spirit of the invention or the scope of the subjoined claims.

Having thus described my invention, I claim:

1. A method of forming a substantially U-shaped wire member and welding the same to a metal part, comprising supporting the metal part in a selected position, moving a wire so that its end portion is brought opposite to and spaced from said metal part, severing the end portion from the wire for providing a wire section and holding the wire section in position, moving a punch upon a complete stroke toward the metal part, forming the wire section into a substantially U-shaped member by forcing the wire section through a tubular die arranged near and spaced from the metal part by the movement of the punch during the first part of its stroke, moving the formed U-shaped wire member into contact with the metal part by the movement of the punch during the remainder of its stroke for completing the stroke, welding the U-shaped wire member to the metal part, and separating the punch from the welded U-shaped wire member.

2. A method of forming a substantially U-shaped wire member and welding the same to a metal part, comprising supporting the metal part in a selected position, arranging a wire section opposite to and spaced from the metal part, moving a punch upon a complete stroke toward the metal part, forming the wire section into a substantially U-shaped wire member arranged upon and carried by the punch during the first part of the stroke of the punch, moving the formed U-shaped wire member carried by the punch into contact with the metal part by the movement of the punch during the remainder of its complete stroke, welding the U-shaped wire member to the metal part, and separating the punch from the welded U-shaped wire member.

3. A method of forming a substantially U-shaped wire member and welding the same to a metal part, comprising supporting the metal part in a selected position, moving a wire so that its end portion is brought opposite to and spaced from said metal part, severing the end portion from the wire for providing a wire section, moving a punch upon a continuous complete stroke toward the metal part, engaging the wire section at its intermediate portion by the punch and forming the wire section into a substantially U-shaped member arranged upon and carried by the punch by forcing the wire section through a tubular die arranged near and spaced from the metal part by the movement of the punch during the first part of its stroke, moving the U-shaped wire member carried by the punch into contact with the metal part by the movement of the punch during the remainder of its complete continuous stroke, welding the U-shaped wire member to the metal part, and separating the punch from the welded U-shaped wire member.

4. A method of forming a substantially U-shaped wire member and welding the same to a metal part, comprising supporting the metal part in a selected position, forming a flattened portion in the free end portion of the wire at a point spaced from the free end of the wire, moving the wire so that the flattened portion is brought opposite to and spaced from the metal part, severing the free end portion of the wire at a point spaced from the flattened portion to provide a wire section having the flattened portion arranged in an intermediate position, moving a punch upon a continuous complete stroke toward the metal part, engaging the flattened portion by the punch and forming the wire section into a substantially U-shaped member arranged upon and carried by the punch by forcing the wire section through a tubular die arranged near and spaced from the metal part by the movement of the punch during the first part of its stroke, moving the U-shaped wire member carried by the punch into contact with the metal part and out of contact with the tubular die by the movement of he punch during the remainder of its complete continuous stroke, welding the U-shaped wire member to the metal part, and separating the punch from the U-shaped wire member.

5. A method of forming a substantially U-shaped wire member and welding the same to a metal part, comprising supporting the metal part at a selected position, forming a wire section and forming an intermediate flattened portion in the wire section, arranging the flattened portion opposite to and spaced from the metal part, moving a punch upon a continuous complete stroke toward the metal part, engaging the flattened portion by the punch and bending the wire section at the ends of the flattened portion and forming the wire section into a substantially U-shaped wire member arranged upon and carried by the punch by forcing the wire section through a tubular die arranged near and spaced from the metal part by the movement of the punch during the first part of its stroke, moving the U-shaped wire member carried by the punch out of the tubular die and into contact with the metal part by the movement of the punch during the remainder of its complete continuous stroke, welding the U-shaped wire member to the metal part, and separating the punch from the U-shaped wire member.

6. A method of forming substantially U-shaped wire members and welding the same to a metal part, comprising supporting the metal part at a selected position, arranging wire sections upon opposite sides of the metal part and spaced from the metal part, moving punches upon complete strokes toward the metal part, forming the wire sections into substantially U-shaped wire members arranged upon and carried by the punches during the first parts of the strokes of the punches, moving the U-shaped wire members carried by the punches into contact with the metal part by the movement of the punches during the remainder of their strokes, welding the U-shaped wire members to the metal part, and separating the punches from the welded U-shaped wire members.

7. A method of forming a plurality of substantially U-shaped wire members and welding the same to a metal sleeve, comprising supporting the sleeve at a selected position, arranging wire sections opposite to and spaced from the metal sleeve, substantially simultaneously moving punches upon complete strokes toward the metal sleeve, engaging the wire sections at their intermediate portions by the punches and forming the wire sections into substantially U-shaped wire members arranged upon and carried by the punches by forcing the wire sections through tubular dies arranged near and spaced from the metal sleeve by the movement of the punches during the first part of their strokes, moving the U-shaped wire members carried by the punches into contact with the metal sleeve by the movement of the punches during the remainder of their complete continuous strokes, welding the U-shaped wire members to the metal sleeve, and separating the punches from the welded U-shaped wire members.

8. A method of forming a substantially U-shaped wire member and welding the same to a metal sleeve, comprising supporting the metal sleeve at a selected position, arranging the wire upon one side of and spaced from the sleeve and extending the wire longitudinally of the sleeve, indexing the wire to a forming position, forming the wire at the forming position to provide a flattened portion, again indexing the wire so that the flattened portion is brought to a second forming position arranged opposite to and spaced from the sleeve, severing the wire to provide a wire section having the intermediate flattened portion, moving a punch upon a single stroke toward the sleeve, engaging the intermediate flattened portion of the wire section by the punch and forming the wire section into a substantially U-shaped wire member arranged upon and carried by the punch by forcing the wire section through a tubular die arranged near and spaced from the sleeve by the movement of the punch during the first part of its stroke, moving the U-shaped wire member carried by the punch into contact with the sleeve by the movement of the punch during the remainder of its complete stroke, welding the U-shaped wire member to the sleeve, and separating the punch from the welded U-shaped wire member.

9. A method of forming a substantially U-shaped wire member and welding the same to a metal sleeve, comprising supporting the sleeve at a selected position, supporting the wire and forming a flattened portion in the wire at a point spaced from its free end, indexing the wire longitudinally to bring the flattened portion to a position opposite to and spaced from the sleeve, severing the wire at a point spaced from the flattened portion for forming a wire section having an intermediate flattened portion, moving a punch upon a single stroke toward the sleeve, engaging the flattened portion of the wire section by the punch and bending the wire section at the ends of the flattened portion and forming the wire section into a substantially U-shaped wire member arranged upon and carried by the punch by forcing the wire section through a tubular die arranged near and spaced from the sleeve by the movement of the punch during the first part of its stroke, moving the U-shaped wire member carried by the punch into contact with the sleeve by the movement of the punch during the remainder of its complete stroke, welding the U-shaped wire member to the sleeve, and separating the punch from the welded U-shaped wire member.

10. Apparatus for forming a U-shaped wire member and welding the same to a metallic sleeve, comprising a support, a mandrel carried by the support for holding a metallic sleeve, a tubular die arranged opposite to and spaced from the mandrel, means to support and guide a wire across the opening of the tubular die which is remote from the mandrel, means to index the wire longitudinally, a reciprocatory punch to engage with the wire extending across the opening of the tubular die, means to move the punch in a complete stroke toward the mandrel, the movement of the die upon the first part of its stroke serving to force the wire into the die and form the same into a U-shaped member carried by the punch and the movement of the punch during the remaining part of its stroke serving to bring the U-shaped wire member out of the tubular die and in contact with the sleeve upon the mandrel, and a welding circuit electrically connected with the punch and mandrel.

11. Apparatus for forming a U-shaped member and welding the same to a sleeve, comprising a support, a mandrel carried by the support and adapted to receive a sleeve thereon, a member including a tubular die having an opening arranged opposite to and spaced from the sleeve, means to support and guide a wire across said opening of the tubular die, said tubular die having a supporting part at said opening, said member having a recess formed therein near said opening, a spring pressed plunger within said recess, a stationary blade arranged adjacent to said plunger, a reciprocatory blade to coact with the stationary blade to sever the wire, the plunger serving to shift the severed end of the wire outwardly beyond the stationary blade when the reciprocatory blade moves outwardly, means for forming a flattened portion in said wire including a reciprocatory punch, means to index the wire across the end of the tubular die which is remote from the mandrel, a punch arranged to engage that portion of the wire extending across the opening of the tubular die remote from the mandrel, means to move the punch upon a complete stroke through the tubular die and toward the mandrel, the inward stroke of the punch first moving the wire into the tubular die and forming the U-shaped wire member on the punch and then moving the U-shaped wire member into contact with the sleeve, and means to electrically weld the U-shaped wire member to the sleeve.

12. Apparatus for forming a substantially U-shaped member and welding the same to a sleeve, comprising a mandrel to receive the sleeve thereon, a tubular punch including a member having an opening arranged opposite to said sleeve, said member having a recess arranged near said opening, a reciprocatory punch to move within the opening, said punch having oppositely arranged longitudinal grooves, a stationary blade arranged within the recess, a spring pressed reciprocatory plunger arranged within the recess, a reciprocatory blade to coact with the stationary blade, means to support and index a wire across the stationary blade and the end of the tubular punch which is remote from the mandrel, a welding circuit associated with said punch and means to move the punch upon a single stroke toward the mandrel carrying the sleeve to cause the punch to first move the wire into the tubular die and form the U-shaped wire member and then move the U-shaped wire member into contact with the sleeve.

13. Apparatus for forming a U-shaped wire member and welding the same to a metal part, comprising a mandrel for holding a metal part, a tubular die arranged near and opposite to and spaced from the mandrel, a punch arranged to engage with a wire section extending across the end of the tubular die which is remote from the mandrel, means to move the punch by a single stroke toward the mandrel so that it first carries the wire section through the tubular die to form the U-shaped member and then brings the formed U-shaped member into contact with the metal part, and means to electrically weld the member to said metal part.

14. Apparatus for forming a metallic element including an arm and an attaching part, comprising a mandrel for holding a metal part, a tubular die arranged near and opposite and spaced from the mandrel, means for arranging a section of wire across the open end of the tubular die remote from the mandrel, a punch to engage with the wire extending across the opening of the die, and means to move the punch in one stroke toward the mandrel and to thereby cause the punch to first move the wire into the tubular die and form the same into the arm and attaching part which are carried by the die and to then bring the attaching part into contact with the metal part, and means to electrically weld the attaching part to the metal part.

15. A method of forming a substantially U-shaped wire member and welding the same to a metal part, comprising supporting the metal part in a selected position, arranging a tubular die near and opposite to and spaced from the metal part and having one end remote from the metal part and its opposite end next to the metal part, arranging a wire section across the remote end of the tubular die, moving a punch toward the metal part and into engagement with the wire section and through the remote end of the tubular die and thereby forcing the wire section into the tubular die and forming the U-shaped wire member upon the punch, continuing the movement of the punch toward the metal part while the U-shaped wire member remains thereon for bringing the U-shaped member out of the bore of the tubular die and into contact with said metal part, welding the U-shaped wire member to the metal part while it is held in contact therewith, and then separating the punch from the welded U-shaped wire member.

16. Apparatus for forming a U-shaped wire member and welding the same to a metal part, comprising a mandrel upon which the metal part is mounted, a tubular die supported near and spaced from and opposite to the mandrel and having a bore which is arranged transversely of the mandrel, said bore having an outer end remote from the mandrel and an inner end spaced from the mandrel, means for arranging a wire section across the outer end of said bore, a punch extending longitudinally of the bore of the tubular die, means for holding the punch in an outer position so that its free end is disposed upon the outer side of the wire section extending across the outer end of the bore, means to move the punch inwardly toward the wire section for engagement therewith and forcing the wire section into the bore of the tubular die and forming the U-shaped wire member upon the punch and continuing the inward movement of the punch toward the mandrel while the U-shaped wire member remains applied to the punch to first withdraw the U-shaped wire member from the bore of the die and then bring the U-shaped wire member into contact with the metal part and to then move the punch outwardly to separate the punch from the U-shaped wire member after the U-shaped wire member is welded to the metal part, and means to electrically weld the U-shaped wire member to the metal part while it contacts with the metal part.

17. Apparatus for forming a U-shaped wire member and welding the same to a metal part, comprising a mandrel upon which the metal part is mounted, a tubular die supported near and spaced from and opposite to the mandrel and having a bore which is arranged transversely of the mandrel, said bore having its outer end remote from the mandrel and an inner end spaced from the mandrel, means for arranging a wire section across the outer end of the bore of the tubular die, a punch, a longitudinally resilient carrier having the punch secured thereto, means to shift the carrier inwardly toward the tubular die and longitudinally of the bore of the tubular die so that the free end of the punch first engages the wire section and then moves into the bore of the tubular die and forms the U-shaped wire member upon the punch and continuing the inward movement of the carrier and punch toward the mandrel while the U-shaped wire member remains applied to the punch to first withdraw the U-shaped wire member from the bore of the die and then bring the U-shaped wire member into contact with the metal part and to then move the punch outwardly to separate the punch from the U-shaped wire member after the U-shaped wire member is welded to the metal part, and means to electrically weld the U-shaped wire member to the metal part while the U-shaped wire member contacts with the metal part.

18. A method of forming a wire element and welding the same to a metal sleeve, comprising supporting the metal sleeve in a selected position, feeding a wire so that its end portion is brought adjacent to and spaced from said sleeve, forming the end portion of the wire into a radial element having a transverse part, moving the radial element toward the sleeve, pressing the transverse part against said sleeve, and electrically welding the transverse part to the sleeve.

References Cited in the file of this patent

UNITED STATES PATENTS

| | | |
|---|---|---|
| 1,314,816 | Lachman | Sept. 2, 1919 |
| 1,787,128 | Swain | Dec. 30, 1930 |
| 2,106,272 | Elsey | Jan. 25, 1938 |
| 2,263,294 | Fluke | Nov. 18, 1941 |
| 2,477,894 | Pityo et al. | Aug. 2, 1949 |
| 2,684,421 | Hipple | July 20, 1954 |
| 2,685,017 | Anderson et al. | July 27, 1954 |
| 2,734,119 | Pityo | Feb. 7, 1956 |
| 2,779,858 | Pityo | Jan. 29, 1957 |

Notice of Adverse Decision in Interference

In Interference No. 90,217 involving Patent No. 2,846,561, A. F. Pityo, Method of and apparatus for forming U-shaped members and welding the same to metallic parts, final judgment adverse to the patentee was rendered April 26, 1960, as to claim 18.

[*Official Gazette October 18, 1960.*]